(12) United States Patent
Albright

(10) Patent No.: US 6,451,953 B1
(45) Date of Patent: *Sep. 17, 2002

(54) CHAIN ENTANGLEMENT CROSSLINKED POLYMERS

(75) Inventor: Robert L. Albright, Southampton, PA (US)

(73) Assignee: Sun Drilling Products, Corp., Belle Chasse, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,425

(22) Filed: Dec. 18, 1997

(51) Int. Cl.$^7$ ................................. C08F 40/00
(52) U.S. Cl. ...................... 526/348; 526/348.8; 526/306
(58) Field of Search ................. 526/306, 348, 526/348.4

(56) References Cited

U.S. PATENT DOCUMENTS

| | | |
|---|---|---|
| 3,922,255 A | 11/1975 | Koestler et al. |
| 4,425,384 A | 1/1984 | Brownscombe |
| 4,855,403 A | 8/1989 | Meschke et al. |
| 5,206,303 A | 4/1993 | Tse et al. |
| 5,238,634 A | 8/1993 | Fetters et al. |
| 5,294,678 A | 3/1994 | Tse et al. |
| 5,531,274 A | 7/1996 | Bienvenu, Jr. |
| 5,583,162 A | 12/1996 | Li et al. |
| 5,633,018 A | 5/1997 | Stouffer et al. |
| 5,653,922 A | 8/1997 | Li et al. |

FOREIGN PATENT DOCUMENTS

| | | |
|---|---|---|
| EP | 0 617 057 A1 | 9/1994 |
| EP | 0 784 062 A2 | 7/1997 |
| WO | WO 92/12190 | 7/1992 |

OTHER PUBLICATIONS

R.S. Porter and J.F. Johnson, Chemical Reviews, 66, (1), 1–27 (1996); "The Entanglement Concept in Polymer Systems".

F.A. Bovey and F.H. Winslow, *Macromolecules, An Introduction To Polymer Science,* Academic Press, New York, 1979, pp. 345–349.

R.T. Bailey, A.M. North, and R.A. Pethrick, *Molecular Motion in High Polymers,* Clarendon Press, Oxford, England (or Oxford University Press Inc., New York), 1981, p. 192.

S. Matsuoka, *Relaxation Phenomena In Polymers,* Hanser Publishers, Munich, (In the USA, Oxford University Press, New York), 1992, pp. 168–178.

F.A.L. Dullien, *Porous Media: Fluid Transport and Pore Structure,* Second Edition, Academic Press, Inc., San Diego, CA, 1992, pp. 8–11 and 237–240.

Dow Chemical Company, Brochure, *DVB; Divinylbenzens,* Midland, MI, Aug., 1989.

elf atochem ATO, Brochure, *Halflife; Peroxide Selection Based in Half–Life,* Sec. Ed., Philadelphia, PA.

J.R. Fried, *Polymer Science and Technology:* Prentice Hall PTR, Englewood Cliffs NJ, USA, 1995, pp. 28–37.

elf atochem ATO, Brochure, *General Catalog Peroxides & Specialty Chemicals,* Philadelphia, PA Aug. 1995.

elf atochem ATO, Brochure, *Halflife; Peroxide Selection Based on Half–life,* Sec. Ed., Philadelphia, PA.

*Primary Examiner*—Bernard Lipman
*Assistant Examiner*—N. Sarafin
(74) *Attorney, Agent, or Firm*—Dan M. de la Rosa

(57) ABSTRACT

A rigid crosslinked polymer having effective levels of chain entanglement crosslinking produced by a rapid rate polymerization procedure which comprises the steps of creating a radical flux by providing monomer units with an effective amount of an initiator to initiate polymer growth. dispersing the monomers and initiator to form an aqueous dispersion, and heating the aqueous dispersion to a temperature greater than the ten-hour half-life temperature of the initiator.

22 Claims, 2 Drawing Sheets

CHAIN ENTANGLEMENT CROSSLINKED POLYMERS

FIELD OF THE INVENTION

The present invention relates to rigid crosslinked polymers comprising a combination of low levels of a chemical crosslinking agent and high levels of chain entanglement crosslinking. The crosslinked polymers of the present invention can be utilized as proppants, as ball bearings, as lubriglide monolayers, and for drilling mud applications.

BACKGROUND OF THE INVENTION

The rigidity of polymers can be enhanced by utilizing high levels or concentrations of polyfunctional crosslinking agents. Most crosslinked polymers can be manufactured by suspension or droplet polymerization where a liquid monomer mixture is dispersed or suspended in an immiscible liquid medium. Suspension polymerization produces spherical polymer particles that can be varied in size by a number of mechanical and chemical methodologies. These methodologies for making crosslinked polymers are well known and practiced in the art of suspension polymerization.

All of the crosslinking agents known in the art are chemical crosslinkers. There are many polyfunctional crosslinking agents in use, but the most prominent crosslinking monomer is divinylbenzene. Divinylbenzene is used to make insoluble, rigid polymers from acrylate esters, methacrylate esters, vinyl acetate, styrene, vinylnaphthalene, vinyltoluene, allyl esters, olefins, vinyl chloride, allyl alcohol, acrylonitrile, acrolein, acrylamides, methacrylamides, vinyl fluoride, vinylidene difluoride, etc. Almost any molecule carrying a vinyl group (C=C—) can be crosslinked and made rigid by copolymerization with divinylbenzene. Other crosslinking monomers are polyfunctional acrylates, methacrylates, acrylamides, methacylamides and polyunsaturated hydrocarbons.

Another crosslinking methodology known in the art is macroneting. In macroneting, a preformed polymer is swelled in a difunctional reactant and crosslinked with the assistance of a catalyst. An example of macroneting is the crosslinking of polystyrene swelled in a dihalohydrocarbon by the action of a Friedel-Crafts catalyst such as aluminum chloride or ferric chloride.

The beads of this invention differs from the prior art in that the polymeric beads are made rigid and nonelastic by the physical crosslinking of chain entanglement rather than by the chemical crosslinking of polyfunctional monomers.

SUMMARY OF THE INVENTION

Accordingly, the object of the present invention is to provide a polymer with enhanced rigidity having high levels of chain entanglement crosslinking.

Another object of the present invention is to provide a polymer with enhanced rigidity having a combination of low levels of chemical crosslinking agents and high levels of chain entanglement crosslinking.

Still another object of the present invention is to provide a rigid, spherical polymer that reduces work energy and performs numerous mechanical advantages.

Yet another object of the present invention is to provide a polymer with enhanced rigidity that can be utilized as a lubricant in drilling mud formations, as proppants in tertiary oil recovery from wells, as ball bearings for wheels constructed from an engineering plastic, and as a lubriglide monolayer for moving heavy equipment.

A further object of the present invention is to provide a method of manufacturing a polymer with enhanced rigidity.

Another further object of the present invention is to provide a method of manufacturing a drilling mud application, a lubricant, a proppant, a ball bearing and a lubriglide monolayer with enhanced rigidity.

The present invention accordingly relates to a polymer with improved rigidity and having high levels of physical crosslinking properties resulting from chain entanglement. The geometry of the polymer can be beads, spheroids, seeds, pellets, granules, and mixtures thereof. In one embodiment, the polymer of the present invention comprises a combination of low levels of a chemical crosslinking agent and high levels of chain entanglement crosslinking. The physical strength of the polymer is a result of both the chain entanglement and the chemical crosslinking agents.

The chemical crosslinking agent of the polymer comprises from about 1.0% to about 50% by weight of the polymer. In one embodiment, the chemical crosslinking agent is divinylbenzene in the amount from about 1.0% to about 50% by weight of the polymer.

In another embodiment, the chemical crosslinking agent of the polymer is selected from a group consisting of trimethylolpropane trimethacrylate, trimethylolpropane triacrylate, trimethylolpropane dimethacrylate, and trimethylolpropane diacrylate.

In a further embodiment of the invention, the chemical crosslinking agent of the polymer can be selected from a group consisting of pentaerythritol tetramethacryalate, pentaerythritol trimethacrylate, pentaerythritol dimethacrylate, pentaerythritol tetraacrylate, pentaerythritol triacrylate and pentaerythritol diacrylate.

In still a further embodiment, the chemical crosslinking agent can be selected from a group consisting of ethyleneglycol dimethacrylate, ethyleneglycol diacrylate, diethyleneglycol dimethacrylate, diethyleneglycol diacrylate, triethyleneglycol dimethacrylate and triethyleneglycol diacrylate.

In another embodiment of the present invention, the chemical crosslinking agent is a bis(methacrylamide) having the formula:

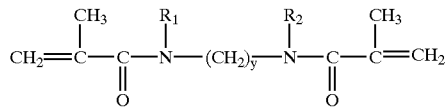

$R_1$ and $R_2$ can be H, alkyl group or aryl group
y=1–100

In yet another embodiment, the chemical crosslinking agent is a bis(acrylamide) having the formula:

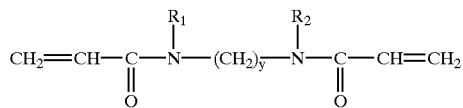

R1 and R2 can be H, alkyl group or aryl group y=1–100

In a further embodiment, the chemical crosslinking agent is a polyolefin having the formula:

where x=1 to 100

In still another embodiment, the chemical crosslinking agent is a polyethyleneglycol dimethacrylate having the formula:

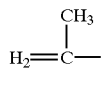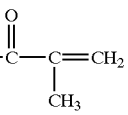

x=2–100

In another embodiment, the chemical crosslinking agent is polyethyleneglycol diacrylate having the formula:

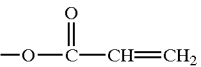

x=2–100

In one embodiment, the chain entanglement of the polymer is produced by a rapid rate polymerization procedure. The procedure comprises the step of elevating a radical flux by employing large concentrations of an initiator within the range from about 1.0% to about 10% weight of the monomers and elevating the polymerization temperature to a temperature greater than the ten-hour half-life temperature by an increasing temperature ramp. The ten-hour half-life temperature is the temperature when half of the initiator decomposes in ten hours.

In another embodiment, the radical flux is kept constant throughout the period of polymer growth by a temperature ramping rate that matches the decreasing first order rate of decay of radical concentration. In a further embodiment, the radical flux is a continually increasing value by employing both multiple initiators with increasing decomposition temperatures and an increasing temperature ramp.

In a still further embodiment, the temperature ramping rate for polymerization is one degree centigrade (Celsius) every three minutes. Such a temperature ramp for polymerization can be continuous or can be a series of step functions of temperature increases followed by plateaus of varying length so that the temperature ramp has the form of increasing steps.

The initiators can be selected from a group consisting of peroxydicarbonates, diacyl peroxides, peroxyesters, dialkyl peroxides, peroxyketals, ketone peroxides, peroxyacids, azo compounds, photo initiators and mixtures thereof.

The above-mentioned polymers of the present invention can be used as a proppant, as a ball bearing, as a lubriglide monolayer, and for oil and gas drilling applications.

The present invention also provides a method of manufacturing rigid polymers having high levels of crosslinking. In one embodiment, the method comprises the step of generating chain entanglement by rapid rate polymerization. The rapid rate polymerization procedure comprises the step of elevating a radical flux by employing large concentrations of an initiator within the range from about 1.0% to about 10% weight of monomer weight and elevating the polymerization temperature to a temperature greater than the ten-hour half-life temperature of the initiator. The radical flux is also elevated by an increasing temperature ramp. The radical flux can also be kept constant throughout the period of polymer growth by a temperature ramping rate that matches the decreasing first order rate of decay of radical concentration. The radical flux can be a continually increasing value by employing both multiple initiators with increasing decomposition temperatures and an increasing temperature ramp. A preferred temperature ramping rate is one degree centigrade (Celsius) every three minutes. The temperature ramp of the radical flux can also be a series of step functions of temperature increases followed by plateaus of varying lengths so that the temperature ramp has the form of increasing steps. In another embodiment, the method further comprises the step of adding low levels of chemical crosslinking from about 1% to about 50% of the polymer weight and preferably from about 1% to about 10% of the polymer weight.

BRIEF DESCRIPTION OF THE DRAWINGS

A more complete appreciation of the present invention and many of the attendant advantages thereof will be readily understood by reference to the following description when considered in connection with the accompanying drawings in which.

DETAILED DESCRIPTION OF THE INVENTION

Figure 1:
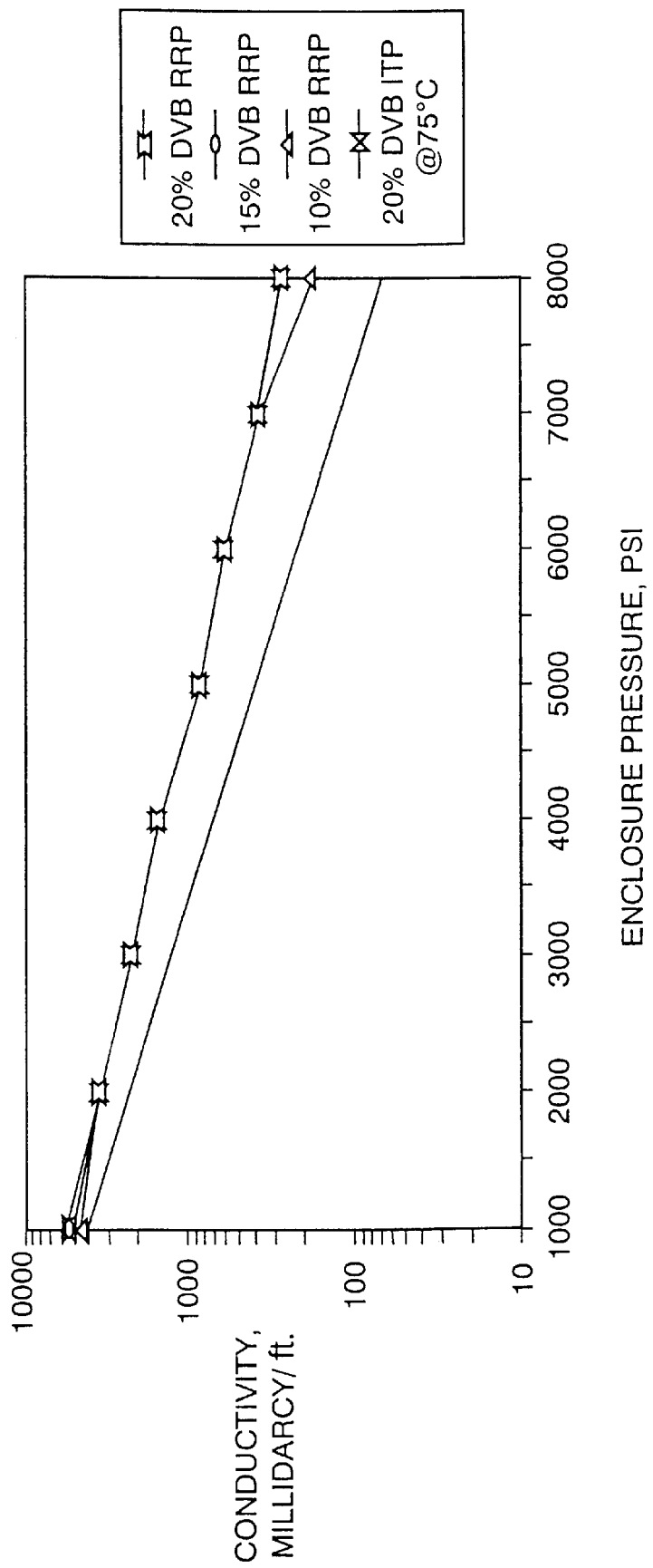
FIG. 1 is a graphical representation of the liquid conductivity of rapid rate polymerization (RRP) polymers with high levels of chain entanglement crosslinking at varying chemical crosslinking densities as a function of enclosure pressure.

The polymer of the present invention is generally spherical beads of a non-porous gelular structure having a skeletal density of between 1.040 and 1.150 g/ml. With a skeletal density in this range, the polymeric beads are readily mixed with water and aqueous salt solutions to give stable slurries. By control over the method of synthesis, the spherical particles can be varied in size from 0.1 to 5.0 millimeters in diameter, and the size distribution can be made to be Gaussian or monosized (all beads of one diameter). Monosized beads can be prepared by jetting, and a Gaussian distribution arises from a stirred reactor system.

The following examples which describe the method of polymer synthesis to enhance chain entanglement crosslinking during polymer formation are illustrative of the invention of this patent and are not to be construed in any way as limitations to the methods of introducing greater levels of chain entanglement crosslinking. The bead polymers of the present invention are prepared by suspension polymerization with the assistance of the polymeric dispersants. Some of the polymeric dispersants in present use are sodium polyacrylates of moderate C, molecular size (60,000 to 250,000 daltons) such as Acumer 1510™ (Rohm and Haas Co.), Sokalan PA 80S™, and Sokalan PA 110S™, (BASF Corp.); cellulosic polymers such as Culminal CMC-2000™ (Aqualon), hydroxyethylcellulose such as the Natrosol™ as (Aqualon), and hydroxyproplycellulose such s the Klucel™'s (Aqualon); and poly (N,N-diallyl-N,N-dimethylammonium chloride) Cat-Floc B™ (Calgon Corp.) A protective colloid such as gelatin is used to provide droplet lifetime. An aqueous phase free radical inhibitor such as sodium nitrite is used to quench emulsion polymerization in the aqueous medium, and a sodium borate buffer at pH of 9–11 is utilized to keep the nitrite anion in anionic salt form throughout the polymer formation.

The polymerizations can either be carried out under an atmosphere of nitrogen to inactivate the phenolic free radical inhibitors in the monomers or the phenolic inhibitors (t-butylcatechol in the DVB and monomethyl ether of hydroquinone (MEHQ) in the styrene) can first be extracted by sodium hydroxide prior to using such monomers.

Crosslinked bead polymers are presently prepared via suspension polymerization by initiation with a molecule that forms free radicals either thermally, photochemically, or by induced radical formation. The most prominent initiators used today are those that develop free radicals by thermal decomposition. The free radical flux used most frequently is that which develops at the ten-hour half life temperature with an initiator concentration of from about 0.2 to about 1.0 wt. % of the total monomer weight when the polymerization is conducted isothermally. The elasticity or rigidity is controlled by the chemical crosslinker level.

It has been discovered that rigid, non-elastic particles are able to be made at moderately low levels of a chemical crosslinker (20% DVB or less) by enhancing chain entanglement. Chain entanglement has been discovered to increase greatly during polymer formation by conducting the polymerization as rapidly as possible. It has been discovered that the faster the rate of the propagation step, the greater is the degree or the level of crosslinking by chain entanglement. And although chain entanglement crosslinking is not equivalent to chemical crosslinking in regulation of volume changes on solvent swelling, it does impart an increased rigidity to the polymer particles such that it can be substituted for chemical crosslinkers.

The propagation rate of polymer growth is greatly enhanced by conducting the polymerization at temperatures above the ten-hour half-life temperature of the specific initiator and by increasing the initiator concentration above the normally employed concentration range (which is from about 0.2% to about 1.0 wt. % of monomer weight). Since the rate of polymer growth (propagation rate) is related to the square root of the radical concentration, doubling the initiator concentration increases the polymer growth rate only by the factor of 1.41 or by about 41% (41.42%). Consequently, the polymer growth quantity and, concomitantly, the rate of chain entanglement crosslinking are increased more effectively by increasing the temperature. In order not to reduce the efficiency of the initiating radical by cage product, a very effective program for speeding up the radical flux and the polymer growth rate is by a temperature ramp. The temperature ramp rate can be designed so that the radical flux remains constant throughout the polymerization process up to about 90% conversion of the monomer to a polymer at which point polymer growth becomes diffusion controlled. Also, dual initiators or higher multiples of initiators can be used so that as the temperature progresses up the ramp, a second initiator (and/or a third initiator, etc.) with a higher temperature of decomposition can be activated to supply the initiating radicals. In utilizing such a technique, the radical flux can be increased, held constant or decreased slightly as the temperature of the polymerization process is ramped to higher values. The only limiting element in high radical-fluxed, ramped-temperature polymerization is the rate or the control over the removal of the heat of polymerization. For suspension (droplet) polymerization the control over the heat of polymer growth, which is an exothermic reaction for most monomers, is exercised by varying the monomer slurry concentration. The immiscible, slurring medium acts as a heat sink, and the larger the concentration of the inert medium, the greater the heat sink.

The specific examples below will enable the invention to be better understood. However, they are given merely by way of guidance and do not imply any limitation.

EXAMPLE 1

The first polymer synthesis is an isothermal polymerization carried out at 80° C., a temperature far above the ten hour half-life temperature of the two initiators being used to generate the free radicals for initiating the polymerization. This temperature differential of 28° C. and 16° C. above the ten hour half-life temperature generates a large radical flux. The dual initiator system was 2,2-azobis(2-cyano-4-methylpentane), Vazo 52 (ten hour half-life of 52° C.) from duPont, and 2,2-azobis(2-cyanopropane), Vazo 64 (ten hour half-life of 64° C.) from duPont.

At 80° C., the half-life for thermal decomposition of Vazo 52 is 13.33 minutes and for Vazo 64 is 73.91 minutes. The concentration of the combined initiators was 4.279 wt % of the monomer charge. Such a system has a radical flux 68 times that of a standard polymerization initiated with 1.0 wt % benzoyl peroxide (BPO) during the first minute at 80° C. and has an average radical flux over the first ten minutes 57 times that of the standard BPO initiated polymerization. These high radical fluxes develop the increased crosslinking by chain entanglement.

Table 1 illustrates the components of the aqueous phase composition for the suspension polymerization.

TABLE 1

| Aqueous Phase Composition, 1600.00 gm: | |
|---|---|
| Water, 98.75 wt %; | 1580.00 gm |
| Dispersant Polymer, 0.3 wt %; | 4.80 gm |
| Sodium Nitrate, $NaNO_2$; 0.3 wt % | 4.80 gm |
| Sodium Metaborate, $NaBO_2$; 0.3 wt % | 4.80 gm |
| Sodium Hydroxide, NaOH pellets, 0.05 wt %; | 0.80 gm |
| Gelatin, 0.3 wt %; | 4.80 gm |
| Total Weight in Grams; | 1600.00 gm |

The aqueous phase is prepared externally in a beaker, first by heating the water to 55° C. to 60° C. and then slowly mixing in the dispersant polymer with sufficient agitation to dissolve the solid polymeric dispersant. The dispersant polymer, if added too fast, will form large clumps. These large clumps are very difficult to dissolve. After the dispersant solution is prepared, the gelatin (dry powder) is slowly introduced to avoid the formation of the large clumps. The aqueous liquid at this point should be homogeneous and should contain no undissolved material. The sodium nitrite, sodium metaborate and sodium hydroxide are then rapidly added to the aqueous solution.

The aqueous liquor is then poured into a round-bottomed flask. The stirring rate is set within the range of 105 to 125 rmp—the upper stirring rate for smaller particles of 300–400 micron diameter and the lower stirring rate for larger particles of 600 to 700 micron diameter. All openings to the flask are closed except for a gas inlet and a gas outlet and the air in the vapor space of the flask is displaced with nitrogen.

Table 2 illustrate the components of the organic phase composition.

TABLE 2

Organic Phase Charges, 725.6 gm of Monomers:

| | |
|---|---|
| In this polymerization, 10.0 wt % of Polymer was Divinylbenzene (DVB), so that 72.56 g of monomer charge was pure DVB provided by impure 55% commercial divinylbenzene. This lot of Dow DVB was 56.3% DVB, 42.0% ethylvinylbenzene (EVB) and 98.3% polymerizable monomers. | |
| DVB, commercial 55% Dow DVB 54.13 gm EVB, 7.46%, 2.19 gm inert material, 10.0% pure DVB, 72.56 gm; | 128.88 gm |
| Styrene, 82.54%; | 598.91 gm |
| Vazo 52; 2,2'-azobis (2-cyano-4methylpentane), 2.2964 gm/100 gm of monomer; | 16.663 gm |
| Vazo 64; 2,2'-azobis(2-cyanopropane), 1.9826 gm/100 gm of monomer; | 14.386 gm |
| Total Weight in Grams | 758.839 gm |

The organic phase is prepared in a beaker by dissolving the two Vazo initiators into the monomer liquid of sytrene, ethylvinylbenzene, and divinylbenzene at 20° C. or less. The temperature is kept at 20° C. or less during the dissolution of the initiators to prevent the thermal decomposition of the initiators. This procedure will yield a homogeneous liquor. The monomer liquor is then dispersed into the aqueous phase by gradual addition dropwise over ten (10) to fifteen (15) minutes with stirring. Droplets of monomer liquor form instantaneously within the continuous aqueous liquid phase with the droplet size being set by the rate of stirring and the temperature. During the addition of monomer liquid to the aqueous liquid, the temperature was maintained between 35° C. to 40° C.

After the monomer addition is completed, the droplet slurry is then stirred for about fifteen minutes to set the droplet size. The temperature is kept within 35° C. to 40° C. during the setting of the droplet size. At the completion of the droplet size setting stage, the slurry of monomer droplets are heated starting at 35° C.–40° C. The heat is then increased from about 40 to about 80° C. over a period of 30 minutes; the temperature is held at 80° C.±20° C. over a period of ten hours to transform liquid monomer droplets into solid gel polymeric beads and to decompose all of the initiator. The temperature is then allowed to drop to ambient.

The beads of the polymer are separated from the aqueous mother liquor and collected on an 80 mesh sieve, washed four times with tap water, and air dried as a thin layer (0.5 inch thick) in an aluminum metal tray. In some instances, oven drying at 70° C. was necessary to reach a free-flowing state. When the beads became free flowing, they were screened through a set of sieves of varying sieve openings to give the particle size distribution, and the yield of polymeric beads within the 16 to 60 mesh cut, a particle diameter range of 250 to 1190 microns. The yield of beads ranges from about 96% to 98% of theory. Elemental analysis show the polymeric beads to be essentially carbon (91.2%) and hydrogen (8.1%).

EXAMPLE 2

The polymer synthesis in Example 2 is very similar to that of Example 1 except for the level of the two initiators, the time-temperature profile, and the stirring rate which is reduced to 88.5 rpm to manufacture large beads. The time-temperature profile is a continuous ramp from about 60° C. to about 87° C. over a 62 minute period for a temperature ramping rate of 0.436° C. per minute followed by a high temperature plateau at 93° C. for 60 minutes to complete the destruction of any remaining initiator.

Table 3 illustrates the components of the aqueous and monomer phases of EXAMPLE 2.

TABLE 3

| | |
|---|---|
| Aqueous Phase, 1600.0 gm: Composition is identical to that of Example 1. | |
| Monomer Phase, 725 6 gm Monomers: | |
| DVB, Commercial 55% Dow DVB | 128.88 gm |
| DVB = 72.56 gm, 10.0% | |
| EVB = 54.13 gm; 7.46% | |
| Inerts = 2.19 gm | |
| Polymerizable Monomers = 126.69 gm | |
| Styrene, 82.5% | 598.91 gm |
| Vazo 52, 1.8674% of monomer charge: | 13.55 gm |
| Vazo 64, 1.2348% of monomer charge | 8.96 gm |

Table 4 illustrates the procedural steps of EXAMPLE 2 in relation to time and temperature.

TABLE 4

Time-Temperature Profile

| Time in Minutes | Temp ° C. | Operation |
|---|---|---|
| 0 | 40 | Begin introduction of monomer liquid into aqueous phase at stirring rpm of 88.6 |
| 20 | 40 | Monomer introduction completed |
| 45 | 41 | Begin temperature ramp to 60° C. over 15 minutes |
| 55 | 54 | Stirring rpm = 88.5 |
| 58 | 60 | Begin temperature ramp to 87° C. over 62 minutes |
| 120 | 87 | Begin temperature ramp to 93° C. over 10 minutes |
| 130 | 92 | Begin Temp. hold for 60 minutes |
| 190 | 93 | Time-Temperature profile completed; Cool to ambient |

Upon completion of the above procedural steps, a milky white bead slurry is produced and is then cooled to 40° C. and filtered through an 80 mesh sieve to collect the beads. The beads are then washed with a water spray followed by one slurry washing with tap water. The beads are drained free of water by pouring the slurry onto the 80 mesh sieve, placed in an aluminum pan and dried overnight in a convection oven at 67.8° C. (154° F.). The free flowing, dried beads are screened through a stack of sieves on a Roto-Tap shaker. The screen analysis is as tabulated in Table 5 below, and the yield of polymer from monomer was 96.58% of theory (700.8 gm polymer from 725.6 gm monomer).

TABLE 5

SCREEN ANALYSIS

| Sieve Opening Microns | Sieve No. | Gross Weight gm | Tare Wt. of Sieve gm | Wt. On Sieve gm | % on Sieve | Cumulative Wt on Sieve | % on Sieve |
|---|---|---|---|---|---|---|---|
| 1190 | 16 | 441.8 | 391.5 | 50.3 | 21.63 | 50.3 | 21.63 |
| 840 | 20 | 526.1 | 404.3 | 121.8 | 52.36 | 172.1 | 73.99 |
| 590 | 30 | 425.2 | 377.2 | 48.0 | 20.64 | 220.1 | 94.63 |
| 500 | 35 | 373.7 | 366.5 | 7.2 | 3.095 | 227.3 | 97.72 |
| 420 | 40 | 365.2 | 362.1 | 3.1 | 1.33 | 230.4 | 99.05 |
| 297 | 50 | 330.6 | 328.9 | 1.7 | 0.73 | 232.1 | 99.785 |
| 250 | 60 | 339.9 | 339.6 | 0.3 | 0.13 | 232.4 | 99.914 |
| −250 | −60 | 339.6 | 339.4 | 0.2 | 0.086 | 232.6 | 100.000 |
| Total: | | | | 232.6 gm | | | |

EXAMPLE 3

The polymer synthesis in Example 3 is similar to that of the first two examples with the exception for the level of DVB (5 wt % versus 10 wt %), the initiator type and level (benzoyl peroxide) at 1.23 wt %, and the temperature-time profile. DVB level is 5.0 wt % of monomer charge supplied by a commercial DVB with 98.0 wt % polymerizable monomers made up of 63.0% DVB and 35% ethylvinylbenzene.

The monomer composition of the polymer in this example is as follows: DVB=5.0 wt % EVB=2.78 wt % Styrene= 92.22 wt %.

The initiator is benzoyl peroxide at a level of 1.23 wt % of polymerizable monomers. The stirring rate is 103.6 rpm.

Table 6 illustrates the procedural steps of Example 3 in relation to time and temperature.

TABLE 6

Time Temperature Profile

| Elapsed Time in Minutes | Temperature °C. | Operation |
|---|---|---|
| 0 | 63 | Begin droplet formation by pouring monomer phase into aqueous phase. |

TABLE 6-continued

Time Temperature Profile

| Elapsed Time in Minutes | Temperature °C. | Operation |
|---|---|---|
| 2 | 62 | All monomer introduced; begin droplet setting stage. |
| 23 | 63 | Begin ramping temperature to 75° C. over ten minutes. |
| 33 | 74 | Begin ramping temperature to 85° C. over next 130 minutes. |
| 143 | 81 | Temp-time reading. |
| 163 | 83 | Begin 83–85° C. temperature plateau over next 50 minutes. |
| 213 | 85 | Ramp temperature over next 10 minutes to 93° C. |
| 225 | 93 | Hold temperature at 93° C. for next 60 minutes. |
| 285 | 93 | Remove heat and begin cooling slurry to ambient temperature. |

Upon completion of the above procedural steps, the slurry is cooled, and clear, transparent beads are collected on an 80 mesh sieve. The beads are then washed four times by slurrying in fresh tap water, and drained free of excess water on the 80 mesh sieve. The beads are air-dried over three days as a thin layer spread over the 80 mesh sieve. After three days, the beads are free flowing and are then screened through a stack of sieves on a Roto-Tap shaker to give the particle size distribution tabulated below in Table 7. The yield of transparent beads from the monomer charged is 95.58% of theory.

TABLE 7

Screen Analysis

| Sieve Opening in Microns | Sieve No | Gross Wt in gm | Tare Wt in gm | Wt. On Sieve in gm | % on Sieve | Cumulative Wt on Sieve | % on Sieve |
|---|---|---|---|---|---|---|---|
| 1190 | 16 | 440.50 | 423.29 | 17.21 | 5.499 | 17.21 | 5.499 |
| 840 | 20 | 589.24 | 403.51 | 185.95 | 59.415 | 203.16 | 64.914 |
| 710 | 25 | 470.40 | 400.51 | 69.89 | 22.331 | 273.05 | 87.245 |
| 590 | 30 | 406.00 | 385.99 | 20.01 | 6.394 | 293.06 | 93.638 |
| 500 | 35 | 378.55 | 369.30 | 9.25 | 2.956 | 302.31 | 96.594 |
| 420 | 40 | 379.78 | 374.70 | 5.08 | 1.623 | 307.39 | 98.217 |
| 350 | 45 | 354.59 | 352.11 | 2.48 | 0.792 | 309.87 | 99.009 |
| 297 | 50 | 349.59 | 349.02 | 0.57 | 0.182 | 310.44 | 99.192 |
| none | pan | 510.08 | 507.55 | 2.53 | 0.808 | 312.97 | 100.00 |
| Total | | | | 312.97 gm | | | |

Figure 2:
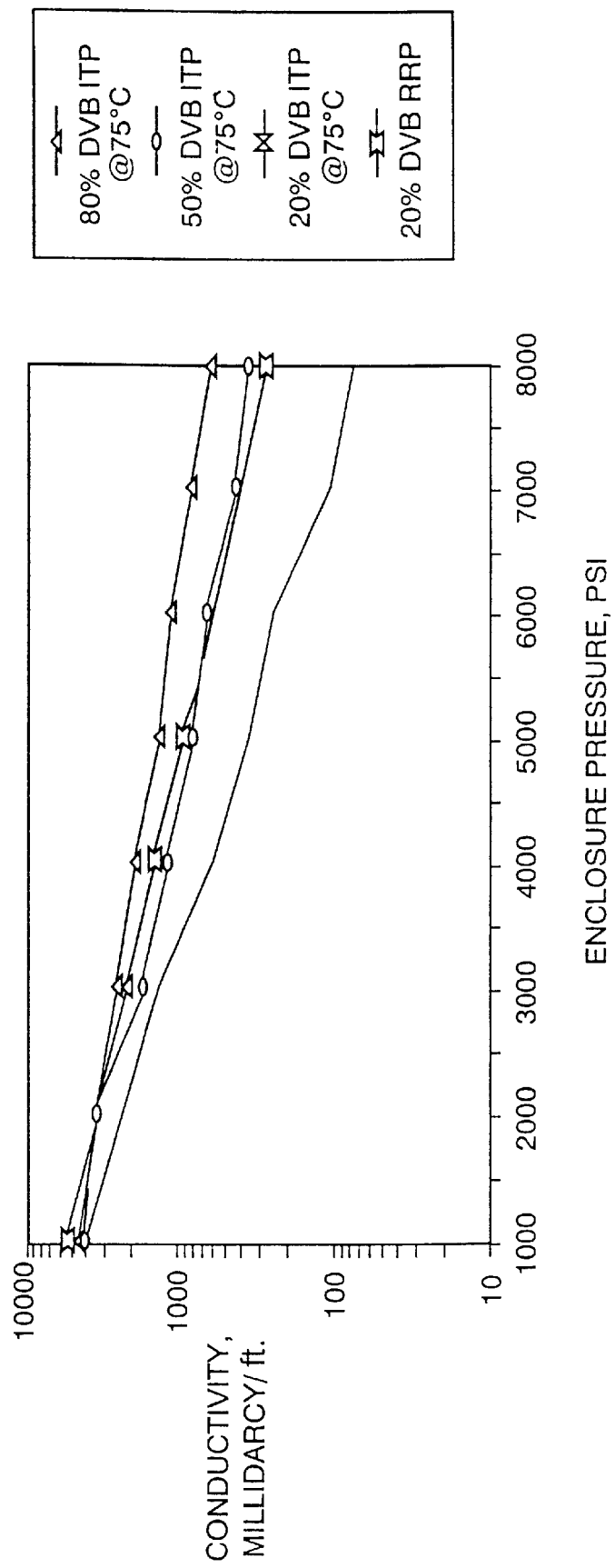
FIG. 2 is a graphical representation of the liquid conductivity of polymers made by isothermal polymerization (ITP) with varying chemical crosslinking at a constant low level chain entanglement density as a function of enclosure pressure.

The polymers labeled with the suffix RRP, which stands for rapid rate polymerization, in Table 9 were all prepared at a very rapid rate of polymer growth at varying levels of chemical crosslinking from about ten (10 wt %) to about twenty weight percent (20 wt %) divinylbenzene. The polymers labeled with the suffix ITP, which stands for isothermal polymerization, in Table 8, were all prepared by the standard isothermal polymerization process at 75° C. with initiation by two wt % t-butyl peroctoate whose ten-hour half-life temperature is 77° C. Comparison of the resistance to deformation as assessed by the conductivity values in Tables 8 and 9, and plotted in the corresponding FIGS. 1 and 2, clearly shows that physical crosslinking by chain entanglement can be substituted for chemical crosslinking. All three RRP polymers have identical resistance to deformation under pressure, even though the chemical crosslinking varied by a factor of two—from 10 to 20 wt. % DVB. Thus, it appears that the chain entanglement crosslinking is controlling in the resistance to deformation under pressure. Plotting the conductivity values of the RRP polymers with the ITP polymers on FIG. 1 places the RRP polymers to be equivalent in deformation resistance to that ITP polymer with 50 wt % chemical crosslinking by divinylbenzene. It is very clearly seen that chain entanglement crosslinking can be substituted for chemical crosslinking by divinylbenzene, thereby allowing the use of greatly reduced levels of divinylbenzene or any other polyfunctional monomer with concomitantly reduced costs in manufacturing of hard plastic beads.

The following procedure was used to determine the conductivity and liquid permeability of the bead polymers of the present invention.

EXAMPLE 4

Conductivity and Liquid Permeability

API cells are loaded with the polymer sample to be tested and the polymer beads are leveled with a blade device.

The polymer samples are placed between Ohio Sandstone and are made a part of a cell stack.

The cells are stacked to within 0.005 inch from top to bottom and positioned between the plattens of the Drake Press. Pressure is increased to 300 psi, and the system is evacuated and saturated with deoxygenated aqueous 2% potassium chloride solution at 72° F.

Once saturated, the enclosure pressure is increased to 500 psi at a rate of 100 psi/min. The system is allowed to equilibrate at each pressure for 30 minutes, after which five measurements are taken. Readings are taken at pressure increments of 1000 psi.

The flow rate and pressure differential are measured at each pressure in order to calculate conductivity. Five measurements are taken and averaged to arrive at each conductivity value. Flow rate is measured with a Mettler balance to 0.01 ml/min. Darcy's Law is used for the calculations to determine the conductivity.

With this equipment, Darcy's Law has the following form:

$$K_{wf} = 26.78 M\ Q/\Delta P$$

Where $K_{wf}$=Conductivity in millidarcies.ft (md.ft)

26.78=constant to account for 1.5×5 inch flow area and the pressure in psi

M=Viscosity of flowing liquid which is a 2 wt % aqueous solution of potassium chloride at ambient temperature Q=Flowrate in ml/min $\Delta P$=Pressure differential across five (5) inch flow path.

Table 8 illustrates the liquid conductivity of the bead polymers made by the rapid rate polymerization (RRP).

TABLE 8

Liquid Conductivity Around Spherical Gel Polymers as a Function of Enclosure Pressure: Polymers with High Levels of Chain Entanglement Crosslinking at Varying Levels of Crosslinking by Divinylbenzene
Conductivity, millidarcie · ft at 0.8 lb/ft$^2$

| Sample→ Label→ | 10% DVB RRP RRP-126 | 15% DVB RRP RRP-132 | 20% DVB RRP RRP-127 |
|---|---|---|---|
| Enclosure Pressure PSI | | | |
| 1000 | 4500 | 5000 | 5500 |
| 2000 | 3500 | 3500 | 3500 |
| 3000 | 2300 | 2300 | 2300 |
| 4000 | 1600 | 1600 | 1600 |
| 5000 | 900 | 900 | 900 |
| 6000 | 650 | 650 | 650 |
| 7000 | 400 | 400 | 400 |
| 8000 | 190 | 275 | 275 |

Table 9 illustrates the liquid conductivity of isothermal polymerization (ITP) polymers.

TABLE 9

Liquid Conductivity Around Spherical Gel Polymers as a Function of Enclosure Pressure: Polymers with Low Levels of Chain Entanglement Crosslinking at Varying Levels of Crosslinking by Divinylbenzene (8, 20, 50, 80 wt. % DVB)
Conductivity, millidarcie · ft at 0.78 lb/ft$^2$

| Sample→ Label→ | 8% DVB ITP Comm Copolymer | 20% DVB ITP ITP-106 | 50% DVB ITP ITP-105 | 80% DVB ITP ITP-101 |
|---|---|---|---|---|
| Enclosure Pressure PSI | | | | |
| 1000 | 6074 | 4173 | 4363 | 4652 |
| 2000 | 3118 | 2234 | 3599 | 3599 |
| 3000 | 1931 | 1428 | 1807 | 2673 |
| 4000 | 984 | 642 | 1259 | 2077 |
| 5000 | 671 | 374 | 867 | 1413 |
| 6000 | 368 | 257 | 696 | 1199 |
| 7000 | 200 | 110 | 444 | 871 |
| 8000 | 112 | 74 | 367 | 637 |

Table 8 and 9 depict the improved rigidity and improved conductivity and liquid permeability of the polymers of the present invention.

Obviously, numerous modifications and variations of the present invention are possible in light of the above teachings. It is therefore to be understood that within the scope of the attendant claims appended hereto, the invention may be practiced otherwise than as specifically disclosed herein.

What is claimed is:

1. A polymer made by a method comprising the steps of:

a) dispersing a monomer and an initiator in a liquid to form a fluid dispersion, said initiator having a concentration greater than about 1% of said monomer weight; and b) heating said dispersion to the ten-hour half-life temperature of said initiator to thereby produce a polymer containing chain entanglement crosslinking.

2. The polymer of claim 1 wherein said initiator has a concentration from about 1 to about 10 weight % of said monomer weight.

3. The polymer of claim 1 wherein said dispersion is heated to a temperature greater than the ten-hour half-life of said initiator.

4. The polymer of claim 1 wherein said monomers are olefinic monomers.

5. The polymer of claim 1 wherein said heating of said dispersion is done at an increasing temperature ramp to produce a sufficient rate of polymerization.

6. The polymer of claim 1 wherein said heating of said dispersion is done at an accelerating rate throughout the period of polymer growth by ramping the temperature at a rate that matches the decreasing first order rate of decay of initiator concentration to provide a constant radical concentration.

7. The polymer of claim 1 wherein said heating of said dispersion is done at a continually increasing rate by employing multiple initiators with increasing thermal stability.

8. The polymer of claim 5 wherein said temperature ramping rate is one degree centigrade every three minutes.

9. The polymer of claim 5 wherein said temperature ramp of said rate is a series of step functions of temperature increases followed by plateaus of varying length so that the temperature ramp has the form of increasing steps.

10. The polymer of claim 1 wherein said initiator is selected from a group consisting of peroxydicarbonates, diacyl peroxides, peroxyesters, dialkyl peroxides, peroxyketals, ketone peroxides, peroxyacids, azo compounds, photo initiators and mixtures thereof.

11. The polymer of claim 1 wherein said polymer further comprises a chemical crosslinking agent.

12. The polymer of claim 1 wherein said polymer is selected from a group consisting of beads, spheroids, seeds, pellets, granules, and mixtures thereof.

13. The polymer of claim 11 wherein said chemical crosslinking agent comprises from about 1% to about 50% by weight of said polymer.

14. The polymer of claim 11 wherein said chemical crosslinking agent is divinylbenzene in the amount from about 1% to about 50% by weight of said polymer.

15. The polymer of claim 11 wherein said chemical crosslinking agent is selected from a group consisting of trimethylolpropane trimethacrylate, trimethylolpropane triacrylate, trimethylolpropane dimethacrylate, and trimethylolpropane diacrylate.

16. The polymer of claim 11 wherein said chemical crosslinking agent is selected from a group consisting of pentaerythritol tetramethacryalate, pentaerythritol trimethacrylate, pentaerythritol dimethacrylate, pentaerythritol tetraacrylate, pentaerythritol triacrylate, and pentaerythritol diacrylate.

17. The polymer of claim 11 wherein said chemical crosslinking agent is a bis(methacrylamide) having the formula:

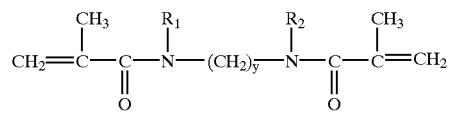

$R_1$ and $R_2$ can be H, alkyl group or aryl group
$y=1-100$.

18. The polymer of claim 11 wherein said chemical crosslinking agent is a bis(acrylamide) having the formula:

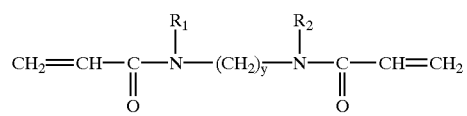

$R_1$ and $R_2$ can be H, alkyl group or aryl group
$y=1-100$.

19. The polymer of claim 11 wherein said chemical crosslinking agent is apolyolefin having the formula:

where $x=1$ to $100$.

20. The polymer of claim 11 wherein said chemical crosslinking agent is a polyethyleneglycol dimethylacrylate having the formula:

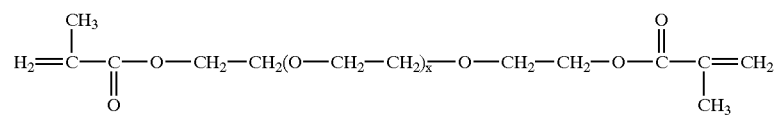

$x=2-100$.

21. The polymer of claim 11 wherein said chemical crosslinking agent is polyethyleneglycol diacrylate having the formula:

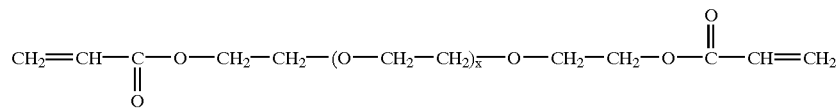

$x=2-100$.

22. The polymer of claim 11, wherein said chemical crosslinking agent is selected from a group consisting of ethyleneglycol dimethacrylate, ethyleneglycol diacrylate, diethyleneglycol dimethacrylate, diethyleneglycol diacrylate, triethyleneglycol dimethacrylate, and triethyleneglycol diacrylate.

* * * * *